United States Patent
Standiford (10) Patent No.: US 7,802,462 B2
(45) Date of Patent: Sep. 28, 2010

(54) GAS FLOWMETER CALIBRATION STAND

(75) Inventor: Dean M. Standiford, Loveland, CO (US)

(73) Assignee: Micro Motion, Inc., Boulder, CO (US)

( * ) Notice: Subject to any disclaimer, the term of this patent is extended or adjusted under 35 U.S.C. 154(b) by 38 days.

(21) Appl. No.: 11/813,522

(22) PCT Filed: Jan. 12, 2005

(86) PCT No.: PCT/US2005/001126

§ 371 (c)(1), (2), (4) Date: Jul. 9, 2007

(87) PCT Pub. No.: WO2006/075984

PCT Pub. Date: Jul. 20, 2006

(65) Prior Publication Data

US 2008/0202197 A1    Aug. 28, 2008

(51) Int. Cl.
*G01F 25/00* (2006.01)
(52) U.S. Cl. ........................... 73/1.16; 73/1.33
(58) Field of Classification Search ............. 73/1.16, 73/1.25, 1.26, 1.27, 1.28, 1.35, 1.36
See application file for complete search history.

(56) References Cited

U.S. PATENT DOCUMENTS

| 3,026,706 A | 3/1962 | Halsell et al. |
| 4,502,318 A * | 3/1985 | Converse et al. ............. 73/1.28 |
| 4,823,592 A | 4/1989 | Hahn |
| 5,470,390 A * | 11/1995 | Nishikawa et al. .......... 118/719 |
| 6,332,348 B1 | 12/2001 | Yelverton et al. |
| 6,408,254 B1 | 6/2002 | Suter |
| 2004/0260483 A1* | 12/2004 | Kar et al. ...................... 702/45 |
| 2006/0162725 A1* | 7/2006 | Downie ................. 128/203.12 |

FOREIGN PATENT DOCUMENTS

| EP | 860648 A2 * | 8/1998 |
| JP | 06300656 A * | 10/1994 |
| JP | 2001324097 A * | 11/2001 |

OTHER PUBLICATIONS

Cascetta F: "Experimental investigations upon the pressure effects on two Coriolis mass flowmeters of different generation", ISA Transactions, Instrument Society of America, Pittsburgh, US, vol. 38, No. 2, Apr. 1999, pp. 149-156, XP004165565, ISSN: 0019-0578.
Cascetta F. et al.: "Metrological evaluation of several Coriolis mass flowmeters", Transactions of the Institute of Measurement and Control, Institute of Measurement and Control, Dorking, GB, vol. 14, No. 5, Jan. 1992, pp. 254-264, XP000321353, ISSN: 0142-3312.

* cited by examiner

*Primary Examiner*—David A. Rogers
(74) *Attorney, Agent, or Firm*—The Ollila Law Group LLC (57) ABSTRACT

A gas flow stand (200) is provided according to an embodiment of the invention. The gas flow stand (200) includes a weighing device (210) and a meter under test (203) positioned on the weighing device (210). The gas flow stand (200) further includes a gas source (201) positioned on the weighing device (210) and conduit (205) connecting the gas source (201) and the meter under test (203). The weighing device (210) generates a weight measurement for the meter under test (203), the gas source (201), and the conduit (205).

22 Claims, 4 Drawing Sheets

GAS FLOWMETER CALIBRATION STAND

BACKGROUND OF THE INVENTION

1. Field of the Invention

The present invention relates to a gas flow stand.

2. Statement of the Problem

Gas metering is used in many applications for measuring and/or controlling a volume of gas. Many manufacturing and production operations include gas metering, wherein a gas or gases are metered into a manufacturing process or metered out of a production process. A mass flow meter can be used to measure and/or meter out gases in precise quantities. Accuracy in the mass flow meter is therefore very important.

Manufacturers of mass flow meters typically calibrate their meters before the meters are shipped to customers. The calibration can include many types of calibration processes and apparatus. One common calibration approach is to compare a gas flow measurement produced by a meter under test against a known, highly calibrated mass flow measurement of the same gas flow stream. As a result, the meter under test can be compared to a known measurement standard for purposes of calibration. One such type of calibration apparatus is a gas flow stand.

Figure 1:
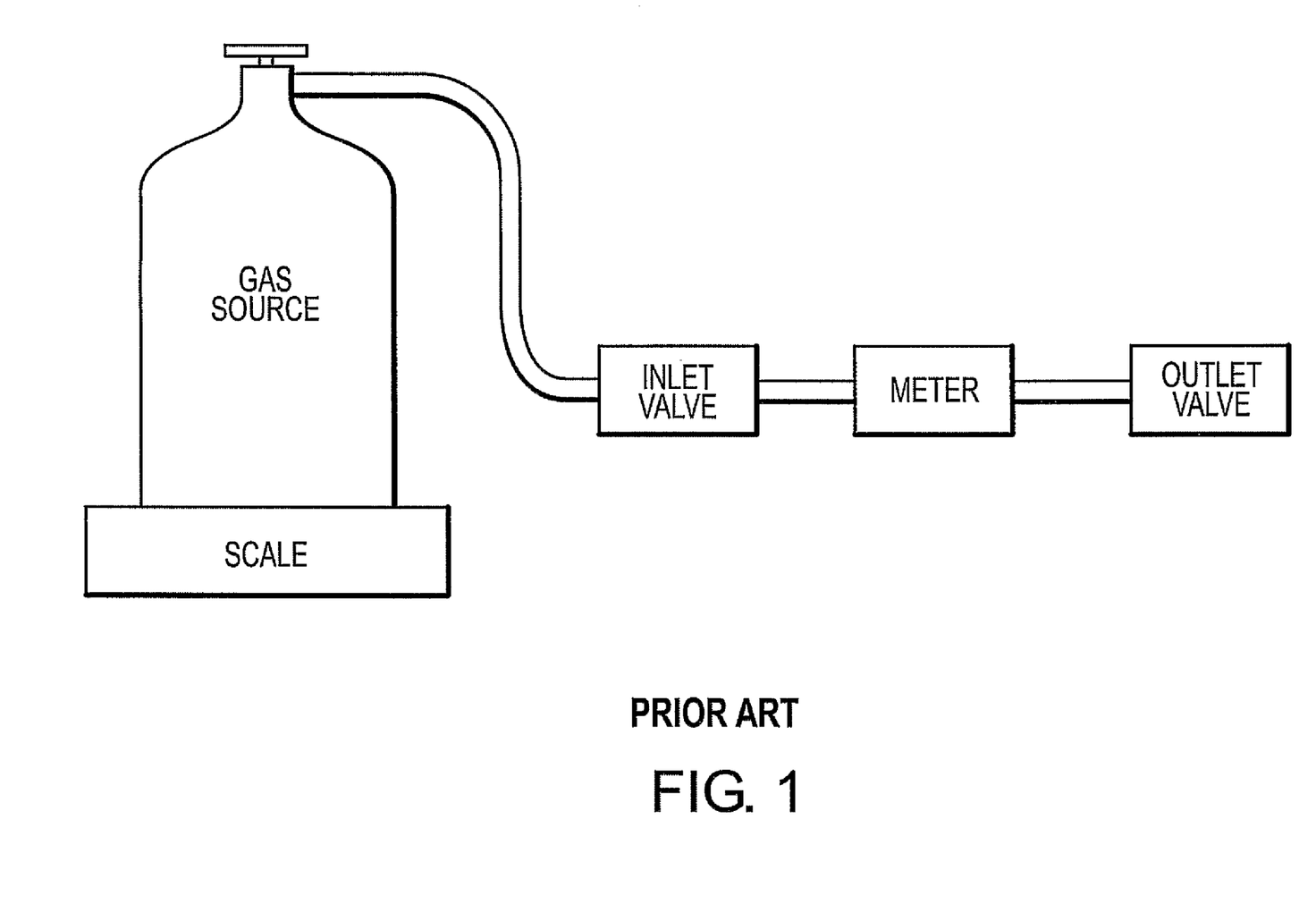
FIG. 1 shows a prior art gas flow stand.

FIG. 1 shows a prior art gas flow stand. The prior art gas flow stand can include a gas source, an inlet valve, a meter under test, and an outlet valve. The prior art gas source typically comprises a pressurized tank or bottle that is connected to the meter under test. The gas source container in the prior art is typically a single large gas container. In the prior art, the gas source is weighed to obtain an initial weight value, the gas source is then connected to the meter under test and the test is conducted. Subsequently, the gas source is disconnected from the meter under test and the gas source is weighed again to obtain a final weight value. This weight/mass difference is then used to calibrate the mass flow measurement through the meter under test. The calibrated meter can then be delivered to a customer.

The prior art approach has drawbacks. One drawback is that the prior art approach weighs only the gas source and not the entire gas flow stand. The prior art approach weighs the gas source when it is not connected to the gas flow stand. The prior art approach does not accurately or completely take into account the gas left in the gas flow stand. For example, a measurable quantity of gas can be retained in the gas flow stand between the inlet valve and the outlet valve. The prior art attempts to compensate for the gas in the gas flow stand by approximation. The prior art uses a known volume of the gas flow stand apparatus and converts the volume to a mass using a measured temperature and pressure of the gas. However, this involves volume, temperature, and pressure measurements, and therefore the prior art approach introduces additional error and additional uncertainty. The prior art does not directly measure the mass of gas held in the gas flow stand components.

Another drawback is that the prior art approach does not directly measure or accurately take into account the gas that is released to the atmosphere when the gas source is disconnected. The prior art assumes that all of the gas in the weight difference flows through the meter under test. By measuring only the gas source, and neglecting the gas in the gas flow stand components and released gas, the prior art does not achieve a satisfactory level of accuracy.

SUMMARY OF THE SOLUTION

The above and other problems are solved and an advance in the art is achieved through the provision of a gas flow stand, a method of operating a gas flow stand, and a method of forming a gas flow stand.

A gas flow stand is provided according to an embodiment of the invention. The gas flow stand comprises a weighing device and a meter under test positioned on the weighing device. The gas flow stand further comprises a gas source positioned on the weighing device. The gas flow stand further comprises conduit connecting the gas source and the meter under test. The weighing device generates a weight measurement for the meter under test, the gas source, and the conduit.

A method of operating a gas flow stand is provided according to an embodiment of the invention. The method comprises connecting a gas source to the gas flow stand, with the gas source being positioned on a weighing device. The method further comprises connecting a meter under test to the gas flow stand, with the meter under test being positioned on the weighing device. The method further comprises weighing the gas flow stand and the gas source before a test in order to obtain an initial weight. The method further comprises weighing the gas flow stand and the gas source after the test in order to obtain a final weight.

A method of forming a gas flow stand is provided according to an embodiment of the invention. The method comprises providing a weighing device and providing a meter under test positioned on the weighing device. The method further comprises providing a gas source positioned on the weighing device. The method further comprises providing conduit connecting the gas source and the meter under test. The weighing device generates a weight measurement for the meter under test, the gas source, and the conduit.

ASPECTS OF THE INVENTION

In one aspect of the gas flow stand, the meter under test comprises a Coriolis flow meter.

In another aspect of the gas flow stand, the gas source comprises one or more gas containers.

In yet another aspect of the gas flow stand, the gas source comprises two or more gas containers and the gas flow stand further comprises a manifold coupled to the two or more gas containers, wherein the manifold combines gas streams from the two or more gas containers into the conduit.

In yet another aspect of the gas flow stand, the gas flow stand further comprises a heat exchanger.

In yet another aspect of the gas flow stand, the gas flow stand further comprises a pressure regulator.

In yet another aspect of the gas flow stand, the weight measurement comprises an initial weight that includes an initial gas quantity in the gas flow stand before a test and comprises a final weight that includes a final gas quantity in the gas flow stand after the test.

In yet another aspect of the gas flow stand, the gas flow stand further comprises an inlet valve positioned on the weighing device and coupled to an inlet of the meter under test and an outlet valve positioned on the weighing device and coupled to an outlet of the meter under test, wherein the conduit connects the gas source, the inlet valve, the meter under test, and the outlet valve.

In yet another aspect of the method of operating the gas flow stand, the meter under test comprises a Coriolis flow meter.

In yet another aspect of the method of operating the gas flow stand, the gas source comprises one or more gas containers.

In yet another aspect of the method of operating the gas flow stand, the gas source comprises two or more gas containers and the gas flow stand further comprises a manifold coupled to the two or more gas containers, wherein the manifold combines gas streams from the two or more gas containers into a conduit of the gas flow stand.

In yet another aspect of the method of operating the gas flow stand, the method further comprises performing heat compensation in the gas flow stand during the test.

In yet another aspect of the method of operating the gas flow stand, the method further comprises performing pressure regulation in the gas flow stand.

In yet another aspect of the method of operating the gas flow stand, the initial weight includes an initial gas quantity in the gas flow stand before the test and the final weight includes a final gas quantity in the gas flow stand after the test.

In yet another aspect of the method of operating the gas flow stand, the method further comprises determining a calibration factor from the initial weight and the final weight.

In yet another aspect of the method of operating the gas flow stand, the method further comprises performing a mass flow measurement in the meter under test during the test, with the calibration factor being determined from the initial weight, the final weight, and the mass flow measurement.

In yet another aspect of the method of operating the gas flow stand, the method further comprises pressurizing the flow stand with gas from the gas source before the test.

In yet another aspect of the method of forming the gas flow stand, providing the meter under test further comprises providing a Coriolis flow meter.

In yet another aspect of the method of forming the gas flow stand, providing the gas source further comprises providing one or more gas containers.

In yet another aspect of the method of forming the gas flow stand, providing the gas source further comprises providing two or more gas containers and providing a manifold coupled to the two or more gas containers, wherein the manifold combines gas streams from the two or more gas containers into the conduit.

In yet another aspect of the method of forming the gas flow stand, the method further comprises providing a heat exchanger in the conduit.

In yet another aspect of the method of forming the gas flow stand, the method further comprises providing a pressure regulator in the conduit.

In yet another aspect of the method of forming the gas flow stand, the weight measurement comprises an initial weight that includes an initial gas quantity in the gas flow stand before a test and comprises a final weight that includes a final gas quantity in the gas flow stand after the test.

In yet another aspect of the method of forming the gas flow stand, the method further comprises providing an outlet valve positioned on the weighing device and coupled to an outlet of the meter under test and providing an inlet valve positioned on the weighing device and coupled to an inlet of the meter under test, wherein the conduit connects the gas source, the inlet valve, the meter under test, and the outlet valve and wherein the weighing device generates a weight measurement for the meter under test, the inlet valve, the outlet valve, the gas source, and the conduit.

DESCRIPTION OF THE DRAWINGS

The same reference number represents the same element on all drawings.

DETAILED DESCRIPTION OF THE INVENTION

Figure 2:
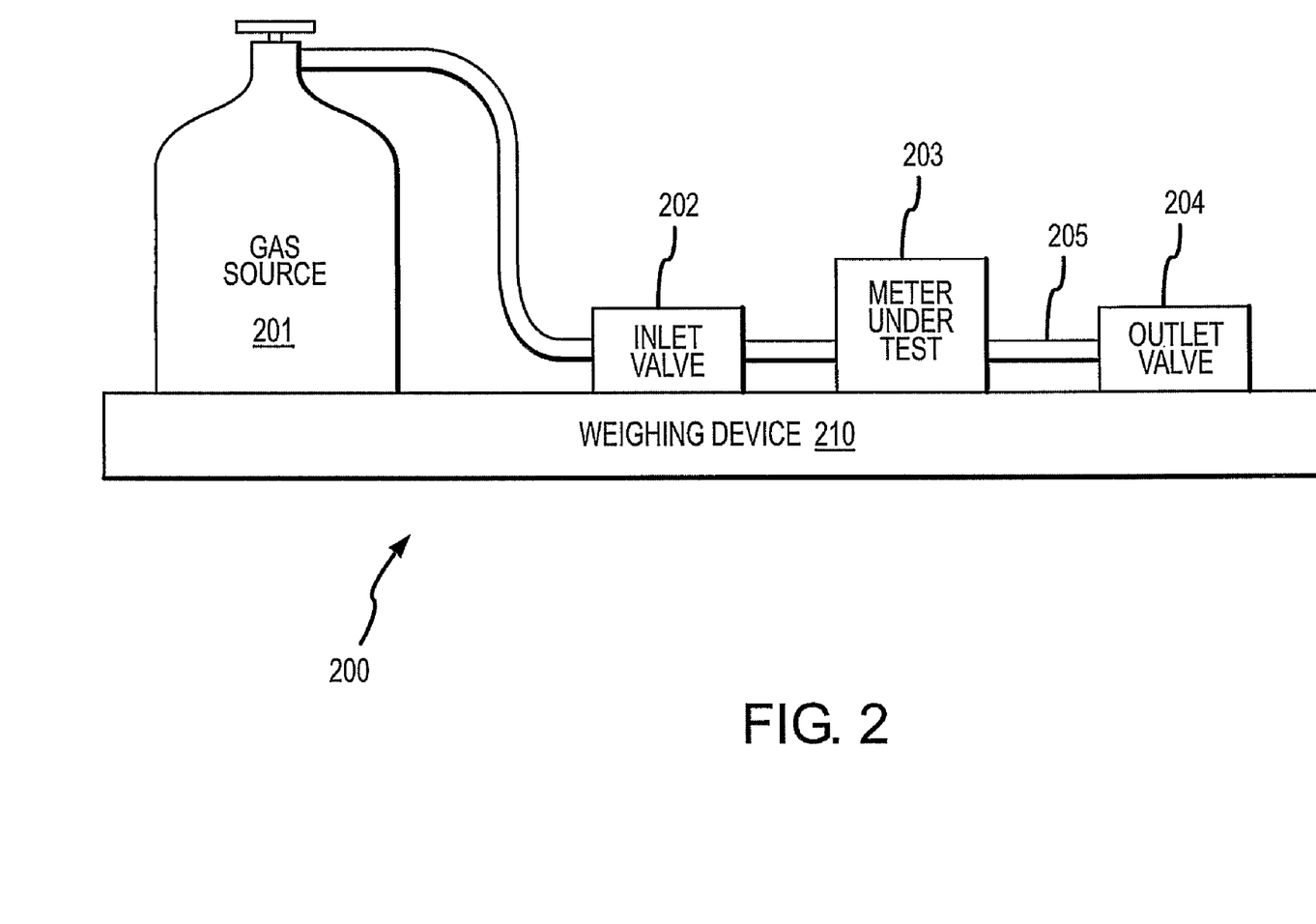
FIG. 2 shows a gas flow stand according to an embodiment of the invention.
Figure 3:
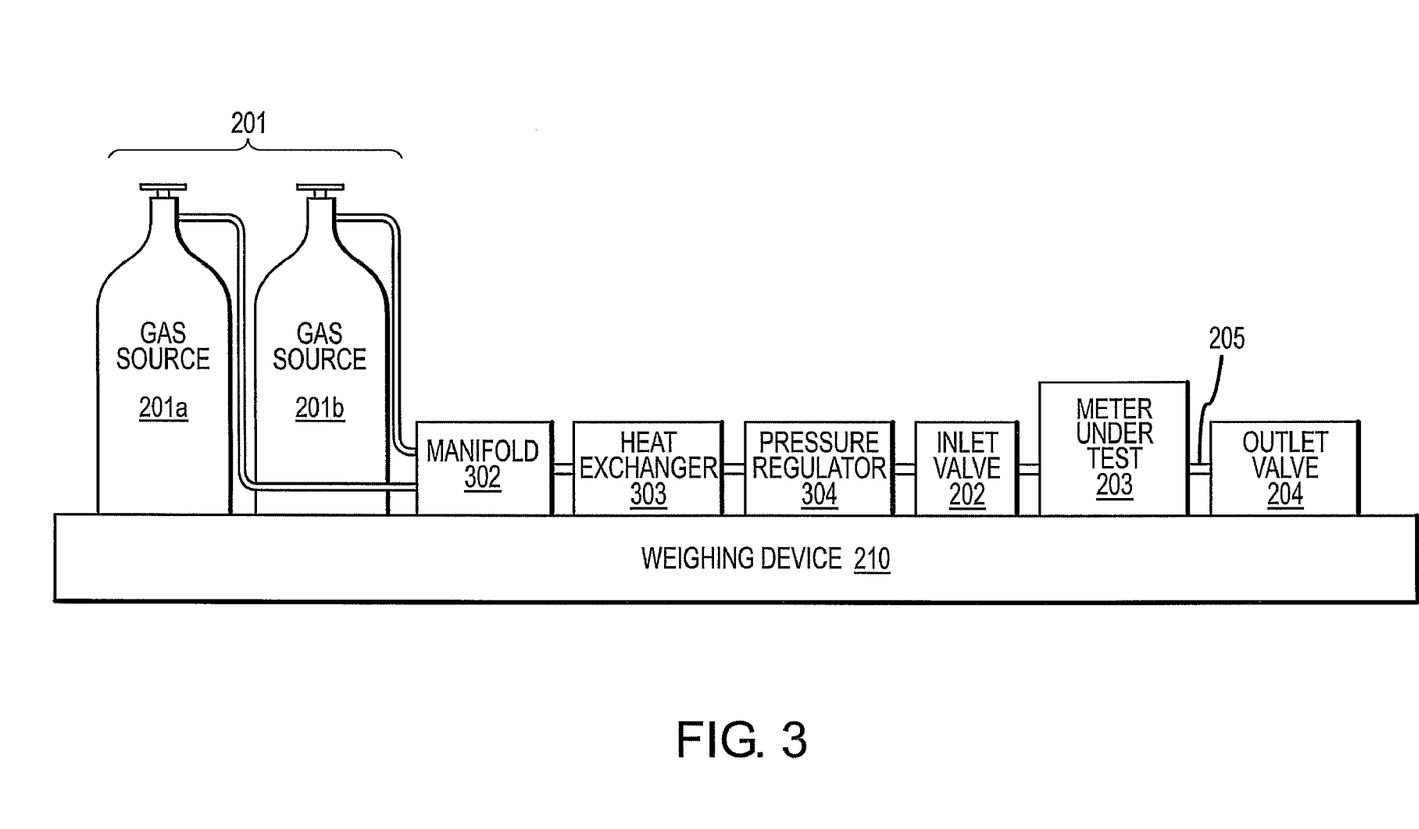
FIG. 3 shows a gas flow stand according to another embodiment of the invention.
Figure 4:
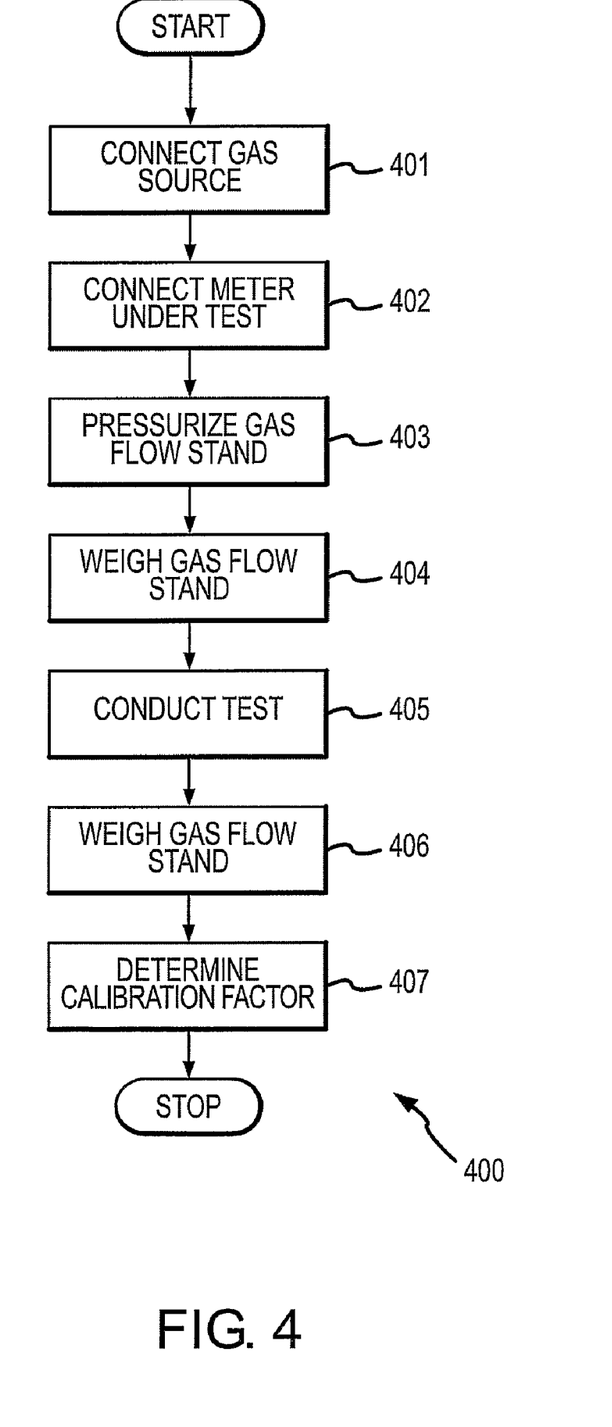
FIG. 4 is a flowchart of a method of operating a gas flow stand according to an embodiment of the invention.

FIGS. 2-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 shows a gas flow stand 200 according to an embodiment of the invention. The gas flow stand 200 in the embodiment shown includes a gas source 201, an inlet valve 202, a meter under test 203, an outlet valve 204, and a conduit 205. The conduit 205 connects the various components. The gas source 201, the inlet valve 202, the meter under test 203, the outlet valve 204, and the conduit 205 are all positioned on a weighing device 210. In addition, the weighing device 210 can be positioned on some manner of support structure, such as a pallet, skid, carriage, etc.

The gas flow stand 200 can be used to calibrate the meter under test 203. In one embodiment, the gas flow stand 200 comprises a primary gas flow stand 200. The gas flow stand 200 flows a test gas through the meter under test 203, wherein the meter under test 203 generates a mass flow measurement during the test and the weighing device 210 generates initial and final weight/mass measurements. The initial weight can include an initial gas quantity in the gas flow stand 200 before a test is run and the final weight can include a final gas quantity in the gas flow stand 200 after the test is run. The initial and final mass measurements can be used to determine a mass difference measurement. The mass difference measurement can be compared to the mass flow measurement generated by the meter under test 203. A calibration factor can be subsequently determined from the initial weight, the final weight, and the mass flow measurement. The weighing device 210 therefore can provide a mass standard that can be used to calibrate the meter under test 203. As a result, the accuracy of the meter under test 203 can be improved and the meter under test 203 can be calibrated according to the mass measurement generated by the weighing device 210.

The gas flow stand 200 differs from the prior art in that the weight measured by the weighing device 210 comprises the weight of the entire gas flow stand, including the weight of gas in the conduit 205 and in the various gas flow stand components. Because the gas can be pressurized, the mass of the gas can be significantly greater than free air in the device. The prior art does not weigh the gas within the gas flow stand components. Although the mass of such gas in the system is relatively small, such as in comparison to the gas source container, for example, disregarding this mass will decrease or degrade the accuracy of the final result. The prior art disregards the mass of this in-system gas, and therefore the prior art is not as accurate as it could be.

The gas source 201 can comprise a container that stores any manner of gas or gases. The gas can be pressurized. The gas source 201 can comprise multiple gas containers (see FIG. 3). The gas source 201 can contain a specific gas, such as a gas that will be used in the meter under test 203 in a final application. For example, if the meter under test 203 will ultimately be used to meter nitrogen, then the meter under test 203 can be calibrated using nitrogen from the gas source 201. Alternatively, multiple different gases can be flowed through the gas flow stand 200 and therefore multiple calibration factors can be obtained for the meter under test 203. Consequently, in one embodiment, the meter under test 203 can be programmed with multiple calibration factors for a variety of field uses.

The inlet valve 202 can regulate admission of the gas into the meter under test 203. The inlet valve 202 can be opened to pressurize the gas flow stand 200 with gas from the gas source 201, such as in a standing-start-finish test scenario (discussed below). Alternatively, the inlet valve 202 can be opened in order to start a test. It should be understood that although the inlet valve 202 is shown as an independent component, the inlet valve 202 can be in combination with another component of the gas flow stand 200, i.e., the inlet valve can comprise a valve of the gas source container, for example.

The meter under test 203 can comprise any manner of flow meter that measures a mass flow of a gas. In one embodiment, the meter under test 203 comprises a Coriolis flow meter. The meter under test 203 can generate a mass flow measurement signal that indicates a mass flow rate through the meter under test 203.

The outlet valve 204 can regulate the emission of gas out of the meter under test 203. The outlet valve 204 can be opened and closed in order to start and stop a test. With the inlet valve 202 opened and with the outlet valve 204 closed, the gas flow stand 200 can be pressurized with gas from the gas source 201.

In some embodiments, the outlet valve 204 can comprise more than one valve. For example, the outlet valve 204 can comprise a rate valve in series with a shutoff valve. In such a configuration, the rate valve can control a flow rate of the gas, while the shutoff valve can start and stop the gas flow.

If the meter under test 203 comprises a Coriolis flow meter, a test can comprise a standing-start-finish test. In a standing-start-finish test scenario, the gas flow stand 200 is first pressurized with gas from the gas source 201. The gas source 201 is already connected to the gas flow stand 200. The entire gas flow stand 200 is weighed by the weighing device 210 in order to obtain the initial weight. All gas pressurizing the entire gas flow stand 200 is included in this weight measurement. At this point, when the gas starts flowing, the Coriolis meter under test 203 can immediately start measuring a mass flow of the gas. No run-up or initial flow needs to be going before the test starts, as the Coriolis meter under test 203 does not need to ramp-up in order to measure mass flow. After the test is complete (i.e., when the outlet valve 204 is closed), then the entire gas flow stand 200 is again weighed by the weighing device 210 in order to obtain a final weight. This is done without disconnecting the gas source 201 from the gas flow stand 200 and without allowing any gas to escape from the system after conclusion of the test. The difference between the initial weight and the final weight comprises a mass difference and therefore a mass flow of gas through the gas flow stand 200.

It should be noted that the gas source 201 is not disconnected from the gas flow stand 200 before the final weighing operation. Therefore, the final weight includes all gas still in the conduit 205 and in the various gas flow stand components. The accuracy of the calibration is therefore advantageously improved.

In one test scenario, the outlet valve 204 can be opened first, followed by opening the inlet valve 202. As a result, gas from the gas source 201 flows freely through the meter under test 203. Subsequently, the outlet valve 204 is closed, wherein the gas source 201 pressurizes the gas flow stand 200. In this manner, all atmospheric air can be purged from the gas flow stand 200. The gas flow stand 200 can then be weighed in order to obtain the initial weight and the test can commence.

The gas flow stand according to any of the embodiments can be capable of calibrating a smaller reference meter that is used in a gas flow loop. In addition, the gas flow stand according to any of the embodiments can be capable of calibrating a transfer standard meter that is used to determine a gas flow loop system uncertainty characteristic.

FIG. 3 shows a gas flow stand 300 according to another embodiment of the invention. Components in common with other embodiments share the same reference numbers. In addition to the previously discussed components, the gas flow stand 300 in this embodiment includes a manifold 302, a heat exchanger 303, and a pressure regulator 304. In addition, this figure shows two or more containers 201a and 201b that comprise the gas source 201.

It should be understood that the order of the various components can be changed as desired. For example, the gas flow stand 300 can include a heat exchanger for each gas source 201a, 201b, etc., wherein these multiple heat exchangers can be located between the respective gas source container and the manifold 302.

The manifold 302 connects to each gas source container 201a, 201b, etc., and combines gas flow streams into the conduit 205. By enabling the use of multiple gas source containers through inclusion of the manifold 302, the gas flow stand 300 can achieve a wide rate of mass flow rates and flow pressures.

The heat exchanger(s) 303 can perform heat compensation in the gas flow stand 300 during a test. This can be desirable (or even necessary) where the gas is highly pressurized. The heat exchanger(s) 303 can be positioned at a location of greatest pressure change, i.e., where greatest cooling of the gas will occur. The heat compensation can be performed in order to avoid condensation and frosting on the various components of the gas flow stand 300. It is undesirable to have additional moisture mass accumulate on exterior surfaces of the various components. Alternatively, the gas flow stand 300 can be allowed to heat up after a test, wherein any accumulated frost/moisture will substantially evaporate. Consequently, allowing some time to elapse before obtaining a final weight may achieve the same result as including the heat exchanger 303. In another alternative, the gas flow stand 300 can include a fan or heater that prevents and/or removes accumulated moisture/frost.

The pressure regulator 304 can regulate a gas pressure in the conduit 205. For example, the pressure regulator 304 can set a pressure in the meter under test 203 that is lower than the pressure available from the gas source 201. In addition, the pressure regulator 304 can provide a substantially constant pressure in the meter under test 203, even as the pressure in the gas source 201 changes as the gas flows out of the gas source 201.

It should be understood that any or all of the above additional components can also be included in the embodiment of FIG. 2. The additional components are presented with regard to FIG. 3 for purposes of clarity.

FIG. 4 is a flowchart 400 of a method of operating a gas flow stand according to an embodiment of the invention. The method includes a standing-start-finish test procedure, wherein the gas flow stand apparatus is pressurized with the test gas before the test commences. In step 401, the gas source 201 is connected to the gas flow stand. For example, the gas source 201 can be connected to the inlet valve 202. Alternatively, the gas source 201 can be connected to another component, such as to the manifold 302, where multiple gas source containers are used.

In step 402, the meter under test 203 is connected to the gas flow stand.

In step 403, the gas flow stand is pressurized with gas from the gas source 201. This step is optional, and alternatively the test can be initiated without first pressurizing the gas flow stand components.

In step 404, the entire gas flow stand is weighed, such as by the weighing device 210. The weighing is done in order to obtain an initial weight. If step 403 has been performed, this weighing step will weigh the gas in the various gas flow stand components, i.e., the initial weight will include an initial gas quantity in the gas flow stand before a test.

In step 405, the test is conducted. The gas from the gas source 201 is flowed through the gas flow stand for a predetermined time period (or until the gas source is depleted). The meter under test 203 can generate a mass flow measurement for the gas as it flows through the gas flow stand.

In step 406, the gas flow stand is weighed again in order to obtain the final weight. The final weight will include a final gas quantity in the gas flow stand after the test. The difference in mass between the initial weight value and the final weight value comprises the mass flow through the gas flow stand (and through the meter under test 203).

In step 407, the determined mass flow can be used to calibrate the meter under test 203. The determined mass flow therefore can be compared to mass flow measurement from the meter under test 203 and can be used to generate an appropriate calibration factor. The calibration factor is determined from the initial weight, the final weight, and the mass flow measurement. In addition, as previously discussed, multiple gases (of different compositions) can be flowed through the meter under test 203 and multiple calibration factors can be obtained for the meter under test 203.

I claim:

1. A gas flow stand (200), comprising:
    a weighing device (210);
    a meter under test (203) positioned on the weighing device (210);
    an outlet valve (204) positioned on the weighing device (210) and coupled to an outlet of the meter under test (203), wherein the outlet valve (204) can be closed; and
    a gas source (201) positioned on the weighing device (210);
    with the gas flow stand (200) configured to open the outlet valve (204) in order to introduce gas from the gas source (201) into the meter under test (203) and purge the meter under test (203), close the outlet valve (204) in order to charge the gas flow stand (200) to a predetermined pressure, weigh the gas flow stand (200) including the gas source (201) to obtain an initial weight of the gas flow stand (200) and gas, open the outlet valve (204) to create flow through the meter under test (203) substantially at the predetermined pressure, close the outlet valve (204) to stop the test, wherein the outlet valve (204) traps a trapped volume of gas within the meter under test (203), and weigh the gas flow stand (200) and the gas source (201) after the test in order to obtain a final weight, wherein a weight measurement comprises the gas flow stand (200) and the gas therein, including the trapped volume.

2. The gas flow stand (200) of claim 1, with the meter under test (203) comprising a Coriolis flow meter.

3. The gas flow stand (200) of claim 1, with the gas source (201) comprising one or more gas containers.

4. The gas flow stand (200) of claim 1, with the gas source (201) comprising two or more gas containers and with the gas flow stand (200) further comprising a manifold (302) coupled to the two or more gas containers, wherein the manifold (302) combines gas streams from the two or more gas containers into the conduit (205).

5. The gas flow stand (200) of claim 1, with the gas flow (200) stand further comprising a heat exchanger (303).

6. The gas flow stand (200) of claim I, with the gas flow stand (200) further comprising a pressure regulator (304).

7. The gas flow stand (200) of claim 1, further comprising:
    an inlet valve (202) positioned on the weighing device (210) and coupled to an inlet of the meter under test (203, wherein the conduit (205) connects the gas source (201), the inlet valve (202), the meter wider test (203), and the outlet valve (204).

8. A method of operating a gas flow stand, the method comprising:
    connecting a meter under test to a gas flow stand including a gas source, with the meter under test and the gas source being positioned on a weighing device and with the gas flow stand including an outlet valve coupled to an outlet of the meter under test;
    opening the outlet valve in order to introduce gas from the gas source into the meter under test and purging the meter under test;
    closing the outlet valve in order to charge the gas flow stand to a predetermined pressure;
    weighing the gas flow stand and the gas source to obtain an initial weight of the gas flow stand and gas;
    opening the outlet valve to create flow through the meter under test substantially at the predetermined pressure;
    closing the outlet valve to stop the test, wherein the outlet valve traps a trapped volume of gas within the meter under test; and
    weighing the gas flow stand and the gas source after the test in order to obtain a final weight, wherein a weight measurement comprises the gas flow stand and the gas therein, including the trapped volume.

9. The method of claim 8, with the meter under test comprising a Coriolis flow meter.

10. The method of claim 8, with the gas source comprising one or more gas containers.

11. The method of claim 8, with the gas source comprising two or more gas containers and with the gas flow stand further comprising a manifold coupled to the two or more gas containers, wherein the manifold combines gas streams from the two or more gas containers into a conduit of the gas flow stand.

12. The method of claim 8, further comprising performing heat compensation in the gas flow stand during the test.

13. The method of claim 8, further comprising performing pressure regulation in the gas flow stand.

14. The method of claim 8, further comprising determining a calibration factor from the initial weight and the final weight.

15. The method of claim 14, further comprising performing a mass flow measurement in the meter under test, during the test, with a calibration factor being determined from the initial weight, the final weight, and the mass flow measurement.

16. A method of forming a gas flow stand, comprising:

providing a weighing device;

providing a meter under test positioned on the weighing device;

providing an outlet valve positioned on the weighing device and coupled to an outlet of the meter under test, wherein the output valve can be closed;

providing a gas source positioned on the weighing device;

providing conduit connecting the gas source and the meter under test; and configuring the gas flow stand to open the outlet valve in order to introduce gas from the gas source into the meter under test and purge the meter under test, close the outlet valve in order to charge the gas flow stand to a predetermined pressure, weigh the gas flow stand including the gas source to obtain an initial weight of the gas flow stand and gas, open the outlet valve to create flow through the meter under test substantially at the predetermined pressure, close the outlet valve to stop the test, wherein the outlet valve traps a trapped volume of gas within the meter under test, and weigh the gas flow stand and the gas source after the test in order to obtain a final weight, wherein a weight measurement comprises the gas flow stand and the gas therein, including the trapped volume.

17. The method of claim 16, with providing the meter under test further comprising providing a Coriolis flow meter.

18. The method of claim 16, with providing the gas source further comprising providing one or more gas containers.

19. The method of claim 16, with providing the gas source further comprising providing two or more gas containers and providing a manifold coupled to the two or more gas containers, wherein the manifold combines gas streams from the two or more gas containers into the conduit.

20. The method of claim 16, further comprising providing a heat exchanger in the conduit.

21. The method of claim 16, further comprising providing a pressure regulator in the conduit.

22. The method of claim 16, further comprising:

providing an inlet valve positioned on the weighing device and coupled to an inlet of the meter under test;

wherein the conduit connects the gas source, the inlet valve, the meter under test, and the outlet valve and wherein the weighing device generates a weight measurement for the meter under test, the inlet valve, the outlet valve, the gas source, and the conduit.

* * * * *

UNITED STATES PATENT AND TRADEMARK OFFICE
CERTIFICATE OF CORRECTION

| | | |
|---|---|---|
| PATENT NO. | : 7,802,462 B2 | |
| APPLICATION NO. | : 11/813522 | |
| DATED | : September 28, 2010 | |
| INVENTOR(S) | : Dean M. Standiford | |

It is certified that error appears in the above-identified patent and that said Letters Patent is hereby corrected as shown below:

Column 2, line 22, replace "farther" with --further--

Column 8, line 22, replace "wider" with --under--

Signed and Sealed this
Eighth Day of March, 2011

David J. Kappos
*Director of the United States Patent and Trademark Office*